United States Patent Office 3,177,274
Patented Apr. 6, 1965

3,177,274
METHOD OF MAKING BEARINGS AND BEARING MATERIAL FOR SUCH BEARINGS
George Christopher Pratt, Wembley, England, assignor to The Glacier Metal Company Limited, Wembley, England, a company of Great Britain
No Drawing. Filed Aug. 6, 1962, Ser. No. 214,865
Claims priority, application Great Britain, Aug. 29, 1961, 31,126/61
8 Claims. (Cl. 264—126)

This invention relates to a method of making plain bearings or a material from which plain bearings can be made, the material being of the general kind forming the subject of the present applicant's United States patent application No. 115,940 and comprising a substantially homogeneous mixture of polyethylene, lead monoxide (PbO) and ammonium manganese phosphate (NH$_4$MnPO$_4$)

In the method of making a plain bearing or a bearing material in he form of an intimate mixture of polyethylene, lead monoxide and ammonium manganese phosphate according to the present invention, the polyethylene is of high molecular weight and the three ingredients each in powdered form, are intimately mixed in the required proportions, the mixture is pressed in a suitable die at a pressure exceeding 2000 pounds per square inch, the material thus produced (herein referred to for convenience as the "pre-pressed material") is broken up and formed into a powder in suitable grinding and/or disintegrating equipment, and the powder thus obtained is then pressed into the required form and sintered at a temperature of between 140° C. and 200° C.

In this specification the expression "high molecular weight" means a molecular weight greater than about 500,000.

The material thus obtained may be in a form suitable for the manufacture of plain bearings from it by machining and finishing operations or separate bearing members may be formed by the final pressing and sintering operations in a form ready for use with or without one or more finishing operations.

The final pressing operation may be "cold," but for larger parts is preferably performed in dies heated to a temperature not exceeding 140° C. and preferably between 110° C. and 130° C. Pressures as high as 100,000 pounds per square inch may be needed for "cold" pressing.

The pre-pressing operation is preferably effected at a pressure exceeding 20,000 pounds per square inch. The percentages of the ingredients may vary but should give a final product containing between 10% and 50% by volume of lead monoxide and between 2% and 30% by volume of ammonium manganese phosphate, the remainder being high molecular weight polyethylene, but the lead monoxide and ammonium manganese phosphate not exceeding 60% by volume of the total volume.

The powder used for each of the various ingredients should be of a particle size such that at least 50% will pass through a 20 B.S.S. mesh sieve. Preferably 100% will pass through a 20 B.S.S. mesh sieve and at least 50% will pass through a 200 B.S.S. mesh sieve, while the high molecular weight polyethylene should have an average molecular weight greater than 500,000 and preferably of 1,000,000 or more, such polyethylene being, for example, that sold by Hoechst Chemicals Ltd., under the identifying title "Hostalen GUR."

The invention may be carried into practice in various ways and two specific examples will now be described.

*Example 1*

An intimate mixture of the required ingredients in powdered form is first obtained by mixing 4960 grams of lead monoxide and 520 grams of ammonium manganese phosphate with 1 kilogram of high molecular weight polyethylene of a molecular weight of 1,000,000 or more, 50% at least of each of the powders passing through a 200-mesh sieve. After the powders have been thus intimately mixed, they are pressed in a suitable die at a pressure of or exceeding 20,000 pounds per square inch, the die being, say 2 inches or more in diameter and of a form such as to provide short cylinders of the pre-pressed material. This pre-pressed material is then broken up and ground to a size capable of passing through a 10-mesh sieve in appropriate grinding equipment such as that known as the Sturtevant "Laboratory Disintegrator." The powder thus obtained is then pressed at a pressure of between 2000 and 20,000 pounds per square inch into bodies of the desired shape in a suitable die or dies, such die or dies are preferably being maintained at a temperature of between 110° C. and 130° C. and not above 140° C. and the body or bodies thus obtained are ejected from the die or dies and sintered in an oven at a temperature of between 140° C. and 200° C. (preferably about 170° C.).

The bodies thus obtained may be in a solid form from which a bearing or bearings can be made by suitable machining or in the form of unfinished bearing members requiring little or no machining or finishing operations.

*Example 2*

What may be called small parts of 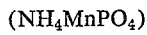 " outside diameter, 7/16" inside diameter, and 7/32" length were made using ingredients in the same proportions as those used in Example 1.

The pre-pressing and powdering were performed as Example 1, but the final pressing operation was performed on a Bussmann Simetag HPM 100 powder metallurgy press, using a pressure of 70,000 pounds per square inch and the pressing was effected at room temperature. An 8 second cycle was achieved.

After pressing the parts were sintered at 170° C.

The pre-pressing and grinding operations referred to above tend to eliminate lack of homogeneity resulting from incomplete mixing of the powders and to provide a powder which will flow more readily for the final pressing operation while so reducing the tendency for cracking to occur during the sintering operation.

It has been found that only parts formed from very high molecular weight polyethylene can be sintered "free," that is to say without being contained within a mould during sintering, without losing their shape, and it is for this reason that high molecular weight polyethylene is employed in the making of plain bearings or plain bearing material according to the present invention.

The term "plain bearing" is to be understood as including any member or assembly having, or designed to have in use, a surface which bears directly or through a liquid or solid lubricant against another surface relatively to which it has sliding movement, irrespective of whether the main or sole purpose is to transmit a load from one to the other of the surfaces having relative sliding movement or whether the sliding contact is solely or partly for some other purpose such, for example, as to provide a seal or to make electrical contact. The term thus includes such members as piston rings, pistons, cylinders and the cages or separators for ball or roller bearings and sliding electrical contact members such as brushes.

In this specification the reference "B.S.S." is to British Standard 410:1943, Table 5.

What I claim as my invention and desire to secure by Letters Patent is:

1. A method of making a plain bearing or bearing material of polyethylene, lead monoxide and ammonium manganese phosphate, the polyethylene having a molecular weight greater than 500,000, in which the three ingredients in powdered form are intimately mixed, the mixture is pressed at a pressure exceeding 2,000 pounds per square inch to produce a pre-pressed material, the pre-pressed material is powdered into granules larger than the original powders and containing the mixed ingredients and then pressed into the required form and sintered at a temperature between 140° C. and 200° C.

2. A method as claimed in claim 1 in which the final pressing operation is performed at about room temperature.

3. A method as claimed in claim 1 in which the final pressing operation is performed at a temperature between 110° C. and 130° C.

4. A method as claimed in claim 3 in which the final pressing operation is performed with a pressure of about 40,000 pounds per square inch.

5. A method as claimed in claim 1 in which the pre-pressing operation is performed at a pressure about 20,000 pounds per square inch.

6. A method as claimed in claim 1 in which at least 50% of the powder used for each of the ingredients will pass through a 20-mesh sieve.

7. A method as claimed in claim 1 in which at least 50% of the powder used for each of the ingredients will pass through a 200-mesh sieve.

8. A method as claimed in claim 1 in which the three ingredients are mixed in the proportions of between 10 and 50% by volume of lead monoxide, between 2 and 30% by volume of ammonium manganese phosphate, the total amount of lead monoxide and the ammonium manganese phosphate not exceeding 60% of the total volume and the remainder being high molecular weight polyethylene.

References Cited by the Examiner

UNITED STATES PATENTS

| | | | |
|---|---|---|---|
| 2,624,514 | 1/53 | Wilhowsky | 241—3 |
| 2,858,299 | 10/58 | Guzzetta | 241—3 |
| 2,981,979 | 5/61 | Seefluth | 264—126 |

FOREIGN PATENTS 777,187  6/57  Great Britain.

ALEXANDER H. BRODMERKEL, *Primary Examiner.*
MICHAEL V. BRINDISI, *Examiner.*